United States Patent [19]

Salee et al.

[11] 4,283,523

[45] Aug. 11, 1981

[54] FLUORO-ALKYL ESTER-TERMINATED LINEAR AROMATIC POLYESTER OF ENHANCED HYDROLYTIC STABILITY

[75] Inventors: Gideon Salee, Williamsville; Jerold C. Rosenfeld, Tonawanda, both of N.Y.

[73] Assignee: Hooker Chemicals & Plastics Corp., Niagara Falls, N.Y.

[21] Appl. No.: 45,463

[22] Filed: Jun. 4, 1979

[51] Int. Cl.$^3$ .................... C08G 63/66; C08G 63/68; C08G 63/76
[52] U.S. Cl. .................... 528/176; 528/126; 528/128; 528/167; 528/169; 528/173; 528/179; 528/184; 528/190; 528/191; 528/193; 528/194; 528/274; 528/271; 528/302; 528/308; 528/309
[58] Field of Search ............. 528/179, 176, 126, 128, 528/167, 169, 173, 184, 190, 191, 193, 194, 274, 271

[56] References Cited

U.S. PATENT DOCUMENTS

| | | |
|---|---|---|
| 3,036,040 | 5/1962 | Lee et al. . |
| 3,160,602 | 12/1964 | Kantor et al. .......................... 528/179 |
| 3,216,970 | 11/1965 | Conix .................................... 528/179 |
| 3,456,422 | 5/1976 | Takahashi et al. . |
| 3,471,441 | 10/1969 | Hindersinn ............................ 528/179 |
| 3,546,165 | 12/1970 | Morgan . |
| 3,939,117 | 2/1976 | Ueno ..................................... 528/179 |
| 4,182,725 | 1/1980 | Floyd et al. . |

FOREIGN PATENT DOCUMENTS

53-8696 1/1978 Japan .

*Primary Examiner*—Hosea E. Taylor
*Assistant Examiner*—Amelia B. Yarbrough
*Attorney, Agent, or Firm*—J. F. Mudd; D. A. Stein

[57] ABSTRACT

The invention relates to a linear aromatic polyester of enhanced hydrolytic stability comprising bisphenol and dicarboxylic acid monomer residues which contains carboxylate ester end groups derived from a fluoro aliphatic alcohol of 1 to 45 carbon atoms. The invention also includes the process of preparing the polyester.

11 Claims, No Drawings

FLUORO-ALKYL ESTER-TERMINATED LINEAR AROMATIC POLYESTER OF ENHANCED HYDROLYTIC STABILITY

BACKGROUND OF THE INVENTION

This invention relates to a linear aromatic polyester comprising bisphenol and dicarboxylic acid monomer residues, the carboxylate end groups of which are structurally modified to provide a product of enhanced hydrolytic stability. More particularly, the invention relates to such polyesters which contain carboxylic acid ester terminal groups which are derived from certain monofunctional fluorine-substituted aliphatic alcohols, i.e. which contain fluoro-alkyl oxy carbonyl ester terminal substituents.

Linear aromatic polyesters prepared from aromatic dicarboxylic acids and bisphenols are well known for their suitability for molding, extrusion, casting, and film-forming applications. For example, U.S. Pat. No. 3,216,970 to Conix discloses the preparation of linear aromatic polyesters comprising monomer residues of isophthalic acid, terephthalic acid, and a bisphenolic compound by the poly-esterification reaction of a bisphenol (inclusive of a biphenol) with the acyl halides of terephthalic and isophthalic acids. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which facilitates molding at temperatures within the operable limits of conventional molding apparatus (i.e. temperatures and pressures of less than about 300° C. and about 20,000 psi respectively). This type of glycol-modified polyester is more fully disclosed in U.S. Pat. No. 3,471,441, to Hindersinn et al.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. However, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water.

It has been proposed (according to T. Ueno et al., Japanese Patent No. Sho 53-8696, published Jan. 26, 1978) to enhance the hydrolytic stability of linear aromatic polyesters comprising bisphenol and dicarboxylic monomer residues by carrying out the preparation of the polyester from the bisphenol and dicarboxylic acid diacyl halide reactants in the presence of a monohydric phenolic compound such as p-tert. butyl phenol. The monofunctional phenolic compound reacts with terminal carbonyl halide substituents in the polyester to form a carboxylate ester end group derived from the monofunctional phenolic reactant. However, as is illustrated by data in the Table below, modification of the polyester to introduce terminal carboxylate ester groups derived from monofunctional phenols (such as p-tert. butyl phenol) does not enhance the hydrolytic stability to make the products attractive commercially.

In the copending U.S. application of J. C. Rosenfeld Ser. No. 045,464 filed of even date with this application, there are disclosed linear aromatic polyesters comprising bisphenol and dicarboxylic monomer residues which contain carboxylate end groups derived from monofunctional hydrocarbon alcohols of 8 to 45 carbon atoms and which possess improved hydrolytic stability. Another copending U.S. Application Ser. No. 045,461 of G. Salee and J. C. Rosenfeld, filed of even date with the present application discloses an improved process of preparing such polyesters by transesterification polymerization.

It is the principal object of the present invention to provide linear aromatic polyesters of enhanced hydrolytic stability with substantial retention of the other beneficial physical and chemical properties of the polyester.

SUMMARY OF THE INVENTION

The invention is directed to a linear aromatic polyester which comprises monomer residues of a bisphenol and a dicarboxylic acid and in which the terminal residues of the polyester chain comprise a residue of said dicarboxylic acid, and wherein, in accordance with the improvement of the invention, the end carboxylate group of said terminal dicarboxylic acid residue comprises a carboxylate ester substituent derived from a fluorine substituted aliphatic monofunctional alcohol of 1 to 45 carbon atoms. The proportion of said fluorine-substituted aliphatic alcohol-derived ester substituent is at least about 5 mole percent based on the total moles of end groups in the polyester.

The invention is also directed to an improvement in the process of preparing the present polyester by the polymerization esterification reaction of said bisphenol and a diacyl halide of said dicarboxylic acid. This improvement comprises carrying out the reaction of about 0.1 mole percent to less than about 50 mole percent of the fluorine substituted monofunctional aliphatic alcohol with the diacyl halide (e.g. a diacyl chloride or bromide) prior to or concurrently with the polymerization reaction, said proportion of fluorine substituted alcohol being based on the moles of said diacyl halide reaction employed in the reaction.

The improved polyester of the invention is characterized by enhanced hydrolytic stability compared to corresponding unmodified polyester and corresponding polyester having carboxylate ester end groups derived from other monofunctional hydroxy-compounds, e.g.

p-tert. butyl phenol (as shown by the comparison of data in the Table below). The polyesters of the invention retain substantially the beneficial chemical and physical properties of conventional bisphenol-dicarboxylic acid linear aromatic polyesters.

DETAILED DESCRIPTION OF THE INVENTION AND THE PREFERRED EMBODIMENTS THEREOF

End Groups of the Polyester

It is known to prepare linear aromatic polyesters comprising bisphenol and carboxylic acid monomer residues containing terminal hydroxy groups and/or terminal carboxylate groups. Terminal carboxylate groups include the group —COOH, and derivatives thereof for example carboxylate salt end groups such as —COONa, carbonyl halide end groups such as —COCl and carboxylate ester end groups such as esters of monohydric hydroxy-organic compounds, e.g. the p-tert. butyl phenol oxycarbonyl ester end group of the polyester of the aforementioned patent of Ueno et al. (the disclosure of which is incorporated herein by reference). The polyesters of the invention are characterized structurally by the presence of terminal carboxylate groups comprising carboxylate ester groups derived from fluorine substituted monofunctional aliphatic alcohols of 1 to 45 carbon atoms.

The fluorine-substituted ester end groups of the present polyesters correspond to the formula —COOR wherein R represents the organic residue of the monofunctional fluorine-substituted aliphatic alcohol.

The fluorine substituted aliphatic residue present in the terminal carboxylate ester group of the present polyester is generally saturated, i.e. is devoid of ethylene or acetylenic unsaturation. The fluorine-substituted residue of the terminal ester group may contain aromatic substituents such as phenyl substituents, aliphatic ether substituents as well as other halogen substituents (e.g. chlorine or bromine) in addition to the fluorine substituents but is devoid of substituents, e.g. hydroxy groups, which are capable of undergoing esterification in the polymerization esterification reaction employed to prepare the present polyesters.

Preferably the fluorine-substituted radical contains in addition to any carbon to carbon bonds only carbon to fluorine bonds, i.e. contains only fluorine substituents or more preferably carbon to fluorine and carbon to hydrogen bonds, i.e. contains only fluorine and hydrogen substituents. The fluorine substituted radical of the terminal carboxylate ester group may be cyclic but, preferably is an acylic aliphatic residue. If acyclic, the fluorine substituted group may be a straight chain or branched chain alkyl group. Preferably the fluorine substituted group of the terminal carboxylate ester substituent of the present polyester is a straight chain aliphatic residue.

The fluorine substituted radical of the terminal ester groups of the present polyester may be derived from a primary, secondary or tertiary fluorine substituted aliphatic alcohol which preferably contains more than one fluorine substituent, i.e. is a polyfluorinated alcohol. Preferably the fluorine substituted radical is derived from a primary fluorine-substituted aliphatic alcohol.

The fluorine-substituted aliphatic residue of the terminal carboxylic groups of the present polyester contain from 1 to 45 preferably 3 to 20 carbon atoms. Especially desirable fluorine-substituted aliphatic groups of the invention contain 10 to 20 carbon atoms.

The fluorine-substituted radicals of the terminal ester groups of the present polyester are illustrated by the following corresponding representative monofunctional fluorine substituted aliphatic alcohols from which they are derived:

CH$_2$FOH
CF$_3$CH$_2$OH
CHF$_2$CH$_2$OH
CF$_3$CH(OH)CHBrF
CF$_3$CF$_2$CH$_2$OH
CF$_3$CH(OH)CH$_2$Br
CF$_3$CH$_2$CH$_2$OH
CF$_3$CH(OH)CH$_3$
CH$_2$ClCH(OH)CH$_2$F
CH$_2$FCH(OH)CH$_2$F
CH$_2$FCH$_2$CH$_2$OH
CH$_2$FCH(OH)CH$_3$
CF$_3$(CF$_2$)$_2$CH$_2$OH
perfluorocyclobutanol
perfluoro-tertiary butyl alcohol

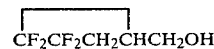
CF$_2$CF$_2$CH$_2$CHCH$_2$OH

CF$_3$(CF$_2$)$_2$C(CH$_3$)$_2$OH

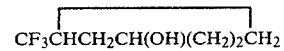
CF$_3$CHCH$_2$CH(OH)(CH$_2$)$_2$CH$_2$

C$_6$F$_5$CH$_2$OH
(CF$_3$CF$_2$CF$_2$)$_3$COH
CF$_3$(CF$_2$)$_8$CH$_2$OH
CHF$_2$(CF$_2$)$_{13}$CH$_2$OH
CHF$_2$(CF$_2$)$_{15}$CH$_2$OH
CHF$_2$(CF$_2$)$_{23}$CH$_2$OH
H(CF$_2$CF$_2$)CH$_2$OH
H(CF$_2$CF$_2$)$_3$CH$_2$OH
H(CF$_2$CF$_2$)$_5$CH$_2$OH
H(CF$_2$CF$_2$)$_6$CH$_2$OH
H(CF$_2$CF$_2$)$_8$CH$_2$OH

The fluorine substituted alcohols of the type described in L. G. Anello et al., U.S. Pat. No. 3,781,370 (the disclosure of which is incorporated herein by reference) such as:

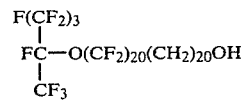
F(CF$_2$)$_3$
|
FC—O(CF$_2$)$_{20}$(CH$_2$)$_{20}$OH
|
CF$_3$ (CF$_3$)$_2$CFOCF$_2$CF$_2$(CF$_2$CF$_2$)$_2$CH$_2$CHI(CH$_2$)$_9$OH
(CF$_3$)$_2$CFOCF$_2$CF$_2$(CF$_2$CF$_2$)$_2$(CH$_2$)$_{11}$OH Especially preferred as fluorine substituted organic radicals of the terminal carboxylate ester groups of the present polyester are fluorine-substituted organic radicals corresponding to primary fluorine-substituted saturated straight chain alcohols of the formula:

H(CF$_2$CF$_2$)$_a$CH$_2$OH wherein a is an integer of 1 to 8.

The aforementioned fluorine substituted alcohols are more particularly described in L. Lee et al., U.S. Pat.

No. 3,036,040, the disclosure of which is incorporated herein by reference.

The polyesters of the invention in general contain at least about 5 mole percent to 100 mole percent of the fluorine-substituted aliphatic carboxylate ester end groups based on the total moles of end groups in the polyester (inclusive of hydroxyl end groups and both ester and non-ester, e.g. free carboxylic acid, carboxylate end groups in the polyester.

Preferred polyesters of the invention contain about 25 to 100 mole percent and especially about 50 to 100 mole percent of the fluorine substituted aliphatic carboxylate ester end groups based on the total moles of end groups in the polyester.

PREPARATION OF THE POLYESTER

According to the preparatory process of the invention, a fluorine-substituted monofunctional alcohol of 1 to 45 carbon atoms (containing the fluorine-substituted group corresponding to that desired in fluorine-substituted carboxylate end group of the polyester) is reacted into the polyester.

According to the preparatory process of the invention, the fluorine-substituted alcohol is reacted with the diacyl halide of the dicarboxylic acid (e.g. a diacyl chloride or bromide) concurrently with, or preferably prior to, the polymerization esterification reaction of the diacyl halide with the bisphenol.

In preparing the present polyester by the aforementioned concurrent mode of reaction of the fluorine-substituted alcohol, the fluorine-substituted alcohol is added to and allowed to react with the diacyl halide at the end, during, or desirably at the beginning of the polymerization esterification of the diacyl halide and the bisphenol reactant. In other words, the fluorine-substituted alcohol reactant of the invention is reacted with the diacyl halide either simultaneously with, or subsequent to, mixing of the bisphenol and the diacyl halide to commence the polymerization reaction.

In the preferred embodiment of the present preparation process, the fluoro-alcohol is contacted and reacted by esterification with the diacyl halide reactant to substantial completion prior to contact of the diacyl halide reactant with the bisphenol under essentially the same conditions, e.g. of temperature, pressure, solvent and catalyst, as are employed in the polymerization reaction. The preferred method for preparing the present polyester provides a more complete reaction of the fluoro-alcohol, i.e. a more complete conversion of the fluoro-alcohol to the desired fluorine-substituted carboxylate ester end group.

The preferred process of preparing the polyesters of the invention is contrary to the practice of the prior art for reacting a linear aromatic polyester with a monofunctional hydroxy organic compound, e.g. p-tert.-butyl phenol, wherein the monofunctional hydroxy reagent is reacted with diacyl halide reactant concurrently with the poly-esterification reaction of said diacyl halide and the bisphenol.

The fluorine-substituted aliphatic carboxylate group-terminated polyesters of the invention may be prepared by the above described modification of known solution or interfacial processes of preparing the linear aromatic polyesters. Generally in the latter known processes a diacyl halide of the dicarboxylic acid, dissolved in a liquid which is a solvent for the polyester to be formed, is condensed in a polymerization esterification reaction with a metal phenolate of the bisphenol, dissolved in a liquid which is immiscible with the solvent for the diacyl halide.

The present process for preparing the fluoro-carboxylate ester group-terminated polyesters of the invention is carried out employing essentially the same conditions, e.g. of temperature and pressure, the same solvents and esterification catalysts and the same polyester product recovery techniques as are employed in the known processes for preparing linear aromatic polyesters comprising bisphenol and dicarboxylic acid monomer residues which employ a diacyl halide reactant.

The foregoing known polyester preparatory procedures include the preparatory technique disclosed by Conix, U.S. Pat. No. 3,216,970, and the polymerization techniques described for preparation of linear aromatic polyesters comprising bisphenol and dicarboxylic monomer residues by P. W. Morgan in "Condensation Polymers" by Interfacial and Solution Methods, Interscience Publishers, 1965, Chapter VIII, particularly pages 332-364. The disclosure of the Conix patent and the Morgan textbook reference are incorporated herein by reference.

An alternate known process for preparing linear aromatic polyesters, disclosed in the aforementioned U.S. Pat. No. 3,471,441, to Hindersinn et al., the disclosure of which is incorporated herein by reference, comprises the homogeneous reaction of a difunctional aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have monomer residues of the aliphatic modifier, e.g. a glycol, incorporated into the structure of the reaction product of the bisphenol and diacid halide, and possess excellent engineering properties such as high impact strength, high modulus, improved moldability and high softening points.

Other known preparatory techniques for preparing such linear aromatic polyesters comprising bisphenol and dicarboxylic acid monomer residues (including the foregoing type of aliphatically modified polyester) are the preparatory procedures disclosed by E. V. Gouinlock, Jr. et al., U.S. Pat. No. 4,051,106 and J. A. Pawlak et al., U.S. Pat. No. 4,051,107, the disclosure of which patents is also incorporated herein by reference.

DIFUNCTIONAL COMPONENTS OF THE POLYESTER

The bisphenol compounds which are utilized as reactants in the preparation of the present polyesters are known compounds and include bisphenols and biphenols corresponding to the general formula:

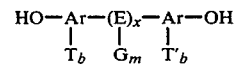

wherein Ar is aromatic, preferably containing 6-18 carbon atoms (including phenyl, biphenyl and naphthyl); G is alkyl, aryl, alkylaryl, arylalkyl, or cycloalkyl; E is a divalent (or di-substituted) alkylene, alkylene, cycloalkylene, or arylene, —O—, —S—, —SO—, —SO$_2$—, —SO$_3$—, —CO—, $$\overset{|}{\underset{|}{GP}}=O$$

or GN<; T and T' are independently selected from the group consisting of G and OG; m is an integer from 0 to the number of replaceble hydrogen atoms on E; b is an integer from 0 to the number of replaceable hydrogen atoms on Ar, and x is 0 or 1. When there is plurality of G substituents in the bisphenols, such substituents may be the same or different. The T and T' substitutents may occur in the ortho, meta or para-positions with respect to the hydroxyl radical. The foregoing hydrocarbon radicals preferably have carbon atoms as follows: alkyl and alkylene of 1 to 14 carbons; aryl and arylene of 6 to 14 carbons; alkylaryl, and arylalkyl of 7 to 14 carbons; and cycloalkyl, and cycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bisphenol-A [i.e. bis(4-hydroxyphenyl)-2,2-propane], bis)3-hydroxyphenyl)-1,2-ethane, bis(4-hydroxyphenyl)-1,2-ethane, as well as the other bisphenols illustrated in G. Salee, U.S. Pat. No. 4,126,602 (issued Nov. 21, 1978) at Column 2, line 68 to Column 3, line 47, the subject matter of said patent being incorporated herein by reference.

Suitable biphenols are p,p'-biphenol and the other biphenols illustrated in the aforementioned U.S. Pat. No. 4,126,602 of G. Salee at Column 3, lines 47-55. Mixtures of isomers of the foregoing bisphenols and biphenols can be used. Preferably the bisphenol monomer residue of the present polyester is derived from bisphenol-A.

The dicarboxylic acids which are useful in the form of their corresponding diacyl halides in the preparation of the present polyesters are also well known and are represented by the formula:

$$HX-\overset{O}{\underset{\|}{C}}-(Z)_n-\overset{O}{\underset{\|}{C}}-XH$$

in which X is oxygen or sulfur, Z is alkylene, —Ar—or —Ar—Y—Ar—where Ar has the same definition as given with respect to the bisphenols, Y is an alkylene, of 1 to 10 carbons, —O—, —S—, —S0—, —SO$_2$—, —SO$_3$—, —CO—

$$\overset{|}{\underset{|}{GP}}=O$$

or GN<; and n is 0 or 1.

Suitable dicarboxylic acids include aromatic dicarboxylic acids such as phthalic acid, isophthalic acid, terephthalic acid, as well as the other aromatic dicarboxylic acids illustrated in the aforementioned U.S. Pat. No. 4,126,602 of G. Salee at Column 4, lines 5-17. Suitable aliphatic dicarboxylic acids include oxalic acid, malonic acid, 1,3-dithiomalonic acid as well as the other aliphatic dicarboxylic acids illustrated in the aforementioned U.S. Pat. No. 4,126,602 of G. Salee at Column 4, lines 17-19.

Preferably the dicarboxylic acid monomer residue of the present polyester is derived from an aromatic dicarboxylic acid and especially from an aromatic dicarboxlyic acid selected from the group consisting of isophthalic acid, terephthalic acid and mixtures thereof.

Most preferably, the dicarboxylic acid component comprises a mixture of about 75 to about 100 mole percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a molar proportion of isophthalic to terephthalic acid residues in the polyester ranging from about 75:25 to about 90:10 provides an especially satisfactory result.

The difunctional aliphatic modifier useful in the preparation of aliphatically modified polyesters as described in the aforementioned Hindersinn et al., Guinlock et al. and Pawlak et al. patents is a reactive difunctional component which may be represented by the formula:

$$H_nD-A-D'_nH$$

wherein D and D' are independently selected from the group consisting of O, S and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkyl, and poly(alkylene carboxylalkylene-carboxy)alkyl; and n is an integer from 1 to 2 with n being 2 when D and D' is N. Typical examples of aliphatic modifiers having the foregoing formula include ethylene glycol, and the other difunctional modifiers illustrated in the aforementioned U.S. Pat. No. 4,126,602 of G. Salee at Column 4, lines 55-66. Combinations of the above-described difunctional aliphatic modifiers can also be employed, usually to obtain special properties.

PROPORTION OF THE REACTANTS

In the preparation of the polyesters of the invention the amount of fluoro-alcohol employed is generally a minor molar proportion, ranging from about 0.1 to less than about 50 mole percent, based on the molar amount of diacyl halide reactant employed. Preferably about 0.1 to about 25 mole percent of the fluorine-substituted alcohol based on the moles of the diacyl halide reactant are charged. More preferably the amount of the fluoro-alcohol employed is about 0.1 to about 10 mole percent and is especially about 1 to about 5 mole percent based on the moles of the diacyl halide reactant.

In preparing the present polyesters, the proportions of dicarboxylic acid diacyl halide and bisphenol reactants used should be such as to provide for at least some carboxylate group termination in the polyester product (i.e. to provide a polyester in which the terminal residues of the polyester comprise a monomer residue of the dicarboxylic acid reactant). As is known, carboxylate group termination in linear aromatic polyesters comprising bisphenol and dicarboxylic monomer residues results from the use of a molar proportion of the dicarboxylic acid reactant ranging from a stoichiometric excess of the dicarboxylic acid reactant (over the molar amount of bisphenol and any difunctional aliphatic modifier reactant employed) to a slight stoichiometric insufficiency of the dicarboxylic acid reactant corresponding to about a 5 mole percent stoichiometric excess of bisphenol and any difunctional aliphatic modifier reactant. Preferably, the polyesters of the invention are prepared employing a molar amount of the dicarboxylic acid reactant which is about equivalent stoichiometrically to the molar amount of bisphenol and any difunctional aliphatic modifier reactant employed.

The fluorine-substituted alcohol reagent of the invention acts as a molecular weight control agent on the polyester product of the invention. Hence, as the molar proportion of the fluorine-substituted alcohol based on the moles of diacyl halide reactant which are charged to the polyester preparation process is increased the molecular weight of the product polyester is lowered. Thus, with use of higher proportions of the fluorine-substituted alcohol in preparing the present polyesters lower molecular weight polyesters are obtained.

The aforementioned higher molecular weight polyesters of the invention which are generally obtained with use of about 25 or less mole percent fluoro-alcohol (based on the moles of diacyl halide reactant) are characterized by a degree of polymerization (d.p.) of above 8 (a d.p. of 8 corresponding to the presence in the polyester of seven bisphenol monomer residues and eight dicarboxylic acid monomer residues) for example, a degree of polymerization of up to 35 to 50 or higher. The aforementioned lower molecular weight polyesters which are generally obtained with use of more than 25 mole percent fluoro-alcohol (based on the moles of diacyl halide reactant) are characterized by d.p. of 8 or less, e.g. a d.p. of 3.

PROPERTIES OF THE POLYESTER

The present polyester products exhibit an enhanced hydrolytic stability (with respect to retention of tensile strength) compared to corresponding conventional linear aromatic polyesters comprising bisphenol-dicarboxylic acid monomer residues of about the same molecular weight while retaining substantially all of the beneficial physical and chemical properties of the known polyesters. The foregoing beneficial effect of the invention is achieved even when other carboxylate ester end groups are present in the polyester (e.g. ester groups derived from mono-functional phenols and aliphatic hydrocarbon monofunctional alcohols) with the fluorine substituted ester end groups of the invention.

The aforementioned lower molecular weight polyesters of the invention which are obtained with use of higher molar proportions of the fluorine-substituted alcohol reactant also exhibit enhanced hydrolytic stability and are useful as additives to conventional linear aromatic polyesters comprising bisphenol and dicarboxylic monomer residues which enhance the water-resistance of the conventional polyesters.

The present polyester can be readily blended with various functional additives such as organic or inorganic fillers (e.g. glass fiber) stabilizers, antistatic agents and flame retardants. As flame retardant additives, the halogen-containing additives disclosed in the copending U.S. applications of G. Salee Ser. No. 863,556 and Ser. No. 863,381, both filed Dec. 22, 1977, are especially suitable for the present polyesters. The disclosures of those applications are incorporated herein by reference.

The polyesters of the invention are readily processed by conventional injection and extrusion molding apparatus to shaped articles such as miniature circuit boards for electrical equipment.

The following examples further illustrate the various aspects of the invention but are not intended to limit it. Various modifications can be made in the invention without departing from the spirit and scope thereof. When not otherwise specified in this specification and claims, temperatures are given in degrees centigrade, and all parts and percentages are by weight.

EXAMPLE 1

Isophthaloyl chloride (228.4 g., 1.125 mole), terephthaloyl chloride (76.1 g., 0.375 mole), a fluoro-alkyl alcohol of the formula $H(CF_2CF_2)_5CH_2OH$ manufactured by E. I. DuPont de Nemours Co. (19.1 g., 0.0359 corresponding to about 2.4 mole percent based on the moles of isophthaloyl and terephthaloyl chloride and containing about 71% fluorine) and 3 liters of distilled methylene chloride are charged to a Morton flask equipped with an addition funnel, a nitrogen inlet, a mechanical agitator, a thermometer and a condenser. Distilled triethylamine esterification catalyst (3.6 g., 0.0359 mole) is charged to the reaction vessel and the resulting mixture is agitated for about 16 hours to complete reaction of the fluorine-substituted alcohol with the diacyl halide reactants.

Bisphenol A (338.5 g., 1.482 mole containing only 0.025% water) is then charged to the reaction mixture which contains isophthaloyl and terephthaloyl chlorides in which the chloride substituents in a portion of the —COCl substituents thereof have been replaced by the fluoro-alkyl group of the fluorine substituted aliphatic alcohol, i.e. have been esterified with the fluoroalkyl group. Additional triethylamine catalyst (309.0 g., 3.054 mole) is added gradually to the reaction mixture over a period of 1.75 hours while the reaction mixture is agitated at a temperature of about 20° to 23°. After completion of the catalyst addition, the reaction mixture is agitated for 2 additional hours at substantially the foregoing temperature conditions to complete the polyesterification reaction.

The resultant white opaque viscous polymerization mass is transferred to a separatory vessel and about 900 ml. of distilled water containing 12 ml. of concentrated aqueous hydrochloric acid is added with agitation to the mixture. The mixture is then allowed to stratify into an aqueous layer and an organic layer. The organic layer is recovered and washed free of chloride ion with distilled water. The resultant washed polymer solution is filtered through a sintered glass filter in the presence of 50 g. of a filter aid to obtain a clear light yellow filtrate.

The polymer product is precipitated from the agitated filtered polymer solution by gradual addition of isopropyl alcohol (employing a volume of isopropyl alcohol equal to that of the solution). During the addition of isopropyl alcohol most of the methylene chloride solvent is distilled from the polymer solution. The white solid polymer product, which is recovered by filtration, is dried in air at ambient temperature for about 16 hours and then in a vacuum oven at 100° for several hours to remove remaining methylene chloride.

There is obtained about 454 g. of bisphenol A-isophthalate terephthalate polyester having a molar ratio of isophthalic acid monomer residues to terephthalic acid monomer residues of about 75:25 and about 50 mole percent carboxylate ester end groups derived from the polyfluoro aliphatic alcohol reactant (based on the total end groups, i.e. hydroxy and carboxylate end groups, in the polyester).

The polyester product has an intrinsic viscosity of about 0.57 dl/g. as determined from a 0.5% solution of the polyester product in symmetrical tetrachloroethane at 30°. The weight average molecular weight and number average molecular of the product are respectively 33,100 and 13,400. The degree of polymerization (d.p.) of the product is about 35.

The polyester product is dried for 2 hours at 120° and melt extruded in a Haake Extruder operating under the following conditions:

| RPM | ZONE: | 1 | 2 | 3 | 4 | Die Melt | TORQUE | AMPERAGE |
|-----|-------|---|---|---|---|----------|--------|----------|
| 100 |       | 290° | 290° | 290° | 290° | 310° | 5000 | 25 m.−g. |

The product is extruded as a clear resin with a very pale yellow cast. The extruded product strand is allowed to cool to ambient temperature and is chopped into pellets having an intrinsic viscosity of 0.57 dl/g. determined as previously described. The pellets are dried and injected molded in an Arburg injection molding apparatus operating under the following conditions:

| Cylinder Temperature: | Zone 1 | 640° F. |
|---|---|---|
|  | Zone 2 | 640° F. |
| Mold Temperature |  | 250° F. |
| Screw Speed |  | 240 rpm |
| Injection Pressure |  | 19,980 psi |
| Plasticating Time |  | 8 sec |

The intrinsic viscosity of the injected molded product is 0.54 dl/g. determined as previously described. The injection molded product is tested for hydrolytic stability by determining the tensile strength and tensile modulus of the product prior to and after immersion of the product in boiling water for 7 days. The results of the test are presented in the Table below.

EXAMPLE 2 (Control)

Bisphenol A (21657 g., 94.835 moles), isophthaloyl chloride (14617 g., 72 moles), terephthaloyl chloride (4873 g., 24 moles), p-tert-butyl phenol (a polyester chain termination agent, 350 g., 233 moles corresponding to 2.4 mole percent based on the moles of isophthaloyl and terephthaloyl chloride) and 500 lbs. of dry methylene chloride are charged to a dry 100 gal. reactor under a blanket of dry nitrogen. Triethylamine catalyst (197.76 moles) is charged under nitrogen to a dry 50 gal. addition vessel connected to the aforementioned 100 gal. reactor. Over a period of 2 hours and 22 minutes the catalyst is added at a steady rate to the reaction mixture in the 100 gal. reactor which is maintained at 20°–24° under agitation. Upon completion of addition of the catalyst, the reaction mixture is agitated for 3 hours at 18°–20° to complete the polymerization. The product which is recovered and dried substantially as described in Example 1. The product which has an intrinsic viscosity of 0.64 dl/g. (determined as described in Example 1) is a bisphenol A-isophthalate-terephthalate polyester having a molar ratio of isophthalic acid monomer residues to terephthalic and monomer residues of about 75:25 having a molecular weight which is about that of the product of Example 1. The product is structurally comparable to that in Example 1 except that instead of the fluoro-alkyl carboxylate ester end groups of the Example 1 product, there are present p-t-butyl phenyl carboxylate ester substituents as carboxylate end groups of the polyester (about 50 mole percent based on the total end groups of the polyester).

The product is compacted by being milled in molten condition for 2.5–3.0 minutes in a Farrell Mill (operating at a front roll temperature of 450° F., a back roll temperature of 425° F. and a roll speed of 45 rpm) and is then injected molded substantially in accordance with the procedure of Example 1 employing a New Britain 75 Injection molding apparatus operating under the following conditions:

| Cylinder Temperature: | Zone 1 | 630° F. |
|---|---|---|
|  | Zone 2 | 610° F. |
| Mold Temperature |  | 239° F. |
| Screw Speed |  | 76 rpm |
| Injection Pressure |  | 20,000 psi |
| Plasticating Time |  | 10 sec |

The injected molded product which has an intrinsic viscosity of 0.53 dl/g. (determined as previously described) is tested for hydrolytic stability as in Example 1. The results of this test are compared with those of the Example 1 product in the Table below.

EXAMPLE 3 (Control)

A bisphenol A-isophthalate-terephthalate polyester which terminates in p-tert butyl phenyl carboxylate ester groups, which is substantially of the same structure as the product of Example 2 except that the molar ratio of the isophthalate acid monomer residues to terephthalic acid monomer residues is about 85:15 instead of 75:25 (as in Example 2), is prepared and molded substantially in accordance with the procedure of Example 2. The hydrolytic stability of the product is evaluated by measuring the tensile strength of the product prior to and subsequent to immersion of the molded product in boiling water for seven days as in Example 2. The results of this test are also reported in the Table below.

TABLE

| Example | Monofunctional hydroxy compound from which carboxylate ester end group of polyester is derived | Tensile properties prior to seven day boiling water immersion of product | Tensile properties subsequent to seven day boiling water immersion of product | Percent loss in tensile strength on immersion |
|---|---|---|---|---|
| 1 | $H(CF_2-CF_2)_5CH_2OH$ | Tensile Strength 9800 psi<br>Tensile Modulus 2.82 psi × $10^5$ | Tensile Strength 8000 psi<br>Tensile Modulus 3.22 psi × $10^5$ | 18.4% |
| 2 (Control) | p-tert. butyl phenol | Tensile Strength 9900 psi<br>Tensile Modulus 1900 psi × $10^5$ | Tensile Strength 1900 psi<br>Tensile Modulus 3.21 psi × $10^5$ | 80.6% |

TABLE-continued

| Example | Monofunctional hydroxy compound from which carboxylate ester end group of polyester is derived | Tensile properties prior to seven day boiling water immersion of product | Tensile properties subsequent to seven day boiling water immersion of product | Percent loss in tensile strength on immersion |
|---|---|---|---|---|
| 3 (Control) | p-tert. butyl phenol | Tensile Strength 9800 psi | Tensile Strength 2802 psi | 71.3% |

The data of the above Table indicates that the fluoro-alkyl oxy carbonyl terminated, i.e. fluoro-alkyl ester group-terminated, linear aromatic polyester of the invention undergoes loss of only about 18.4% of its initial tensile strength on immersion in boiling water for seven days. In contrast corresponding polyesters substituted with p-tert.-butyl phenoxy carbonyl terminal groups (as carboxylate end groups) of Control Examples 2 and 3 undergo loss of more than about 71 to more than about 80% of initial tensile strength on immersion in boiling water for one week. Accordingly, the foregoing data illustrates that the fluoro-alkyl ester terminated polyester is more hydrolytically stable (with respect to retention of tensile strength) to a non-obvious extent than the p-tert.-butyl phenyl ester-terminated polyester of Examples 2 and 3. Since p-tert.-butyl phenyl ester-terminated bisphenol-isophthalate-terephthalate polyesters are indicated as being more hydrolytically stable than the corresponding polyester devoid of carboxylate ester-end groups (according to the aforementioned Japanese patent of T. Ueno et al. No. Sho 53-8696), the foregoing result of the comparison of this data also indicates that the fluoro-alkyl ester-terminated polyester of the invention is more hydrolytically stable than is the corresponding polyester devoid of carboxylate ester end groups.

EXAMPLE 4

The process described in Example 1 is repeated substantially as described except the fluorine-substituted alcohol of example 1 is added to the polymerization reaction mixture simultaneously with the bisphenol A reactant and with the diacyl halide reactants. There is obtained a bisphenol-isophthalate-terephthalate polyester product containing fluoro-alkyl oxy carbonyl terminated ester substituents which exhibits an enhanced resistance to hydrolysis (with respect to retention of tensile strength) which is substantially similar to the hydrolysis resistance of the Example 1 polyester product.

EXAMPLE 5

The procedure of Example 1 is repeated substantially as described except that fluorine-substituted monofunctional alcohol employed is $H(CF_2CF_2)_8CH_2OH$. There is obtained as product a bisphenol-isophthalate-terephthalate polyester having ester end groups of the formula $-COOCH_2(CF_2CF_2)_8H$. The product has excellent properties according to the invention.

EXAMPLE 6

The procedure of Example 1 is repeated substantially as described except that fluorine-substituted monofunctional alcohol employed as $H(CF_2CF_2)_3CH_2OH$. There is obtained as product a bisphenol-isophthalate-terephthalate polyester having ester end groups of the formula $-COOCH_2(CF_2CF_2)_3H$. The product has excellent properties according to the invention.

EXAMPLE 7

The procedure of Example 1 is repeated substantially as described except that the fluorine-substituted monofunctional alcohol employed is $HCF_2CF_2CH_2OH$. There is obtained as product a bisphenol-isophthalate-terephthalate polyester having ester end groups of the formula $-COOCH_2CF_2CF_2H$. The product has excellent properties according to the invention.

The invention has been described in the above specification and illustrated by reference to specific embodiments in the illustrative examples. However, it is to be understood that these embodiments are not intended to limit the invention since, as illustrated, changes and modifications in the specific details disclosed hereinabove can be made without departing from the scope or spirit of the invention.

What is claimed is:

1. In a linear aromatic polyester which comprises monomer residues of a bisphenol and a dicarboxylic acid and in which the terminal residues of the polyester chain comprise a residue of said dicarboxylic acid, the improvement wherein the end carboxylate groups of said terminal dicarboxylic acid residues comprise at least about 5 mole percent of a carboxylate ester of a fluorine substituted saturated aliphatic monofunctional alcohol of 1 to 45 carbon atoms, said proportion being based on the total moles of end groups in the polyester.

2. The polyester of claim 1 wherein said dicarboxylic acid has the formula:

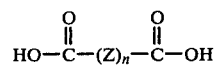

wherein Z is alkylene, —Ar— or —Ar—Y—Ar— where Ar is aromatic, Y is alkylene, haloalkylene, —O—, —S—, —SO$_2$—, —SO$_3$—, —CO—,

or GN<, wherein G is alkyl, haloalkyl, aryl, haloaryl, alkylaryl, haloalkylaryl, arylalkyl, haloarylalkyl, cycloalkyl or cyclohaloalkyl; and n is 0 or 1, the organic residue of said fluorine-substituted alcohol is an acyclic alkyl group which contains only fluorine and hydrogen substituents or only fluorine substituents, and about 5 mole percent to 100 mole percent of the polyester end groups are carboxylate ester end groups derived from said fluorine substituted alcohol.

3. The polyester of claim 2 wherein said dicarboxylic acid is an aromatic dicarboxylic acid, and about 25 mole percent to about 100 mole percent of the polyester end groups are carboxylate ester groups derived from a polyfluorinated alcohol containing only hydrogen and fluorine substituents.

4. The polyester of claim 3 wherein said aromatic dicarboxylic acid is selected from the group consisting of isophthalic acid, terephthalic acid, and mixtures thereof, and about 50 mole percent to about 100 mole percent of the polyester end groups are carboxylate ester groups derived from a fluorine-substituted primary alcohol.

5. The polyester of claim 4 wherein said bisphenol has the formula:

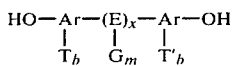

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1, and said fluorine substituted aliphatic alcohol is a straight chain primary alcohol of 3 to 20 carbon atoms.

6. The polyester of claim 5 wherein the bisphenol is bisphenol-A and the fluorine substituted aliphatic alcohol is of the formula:

wherein a is an integer 1 to 8.

7. The polyester of claim 6 wherein the carboxylate ester groups derived from said fluorine-substituted alcohol are present in a proportion of about 50 mole percent based on the total end groups in the polyester and a is 5.

8. A linear aromatic polyester consisting of monomer residues of bisphenol A and a dicarboxylic acid selected from isophthalic acid, terephthalic acid and mixtures thereof containing about 5 to 100 mole percent, based on the total end groups in the polyester, of carboxylate ester end groups of monofunctional saturated acyclic aliphatic alcohol, the aliphatic residue of which contains only fluorine substituents or only fluorine and hydrogen substituents and 3 to 20 carbon atoms.

9. In the process of preparing a linear aromatic polyester which comprises monomer residues of a bisphenol and a dicarboxylic acid by the polymerization esterification reaction of said bisphenol and a diacyl halide of said dicarboxylic acid, the improvement wherein a minor molar proportion, based on the molar proportion of the diacyl halide, of a fluorine-substituted saturated monofunctional aliphatic alcohol of 1 to 45 carbon atoms is reacted into the polyester.

10. The process of claim 9 wherein the fluorine-substituted alcohol is reacted with the diacyl halide reactant prior to the polymerization esterification reaction of the diacyl halide and the bisphenol, and the molar proportion of the fluorine-substituted alcohol is about 0.1 mole percent to about 25 mole percent.

11. The process of claim 9 wherein the fluorine-substituted alcohol is mixed and reacted with the diacyl halide simultaneously with mixing of the bisphenol and the diacyl halide to commence the polymerization esterification reaction, and the molar proportion of the fluorine-substituted alcohol is about 0.1 mole percent to about 25 mole percent.

* * * * *